United States Patent
Arturo et al.

(10) Patent No.: US 9,828,510 B2
(45) Date of Patent: *Nov. 28, 2017

(54) SORBIC ACID ESTER CONTAINING COATINGS COMPOSITION

(71) Applicants: Dow Global Technologies LLC, Midland, MI (US); Rohm and Haas Company, Philadelphia, PA (US)

(72) Inventors: Steven Arturo, Wyncote, PA (US); Selvanathan Arumugam, Blue Bell, PA (US); John Ell, Quakertown, PA (US); Ralph C. Even, Blue Bell, PA (US); Brandon Rowe, Robbinsville, NJ (US); Justin Sparks, Pottstown, PA (US); Decai Yu, Midland, MI (US)

(73) Assignees: Rohm and Haas Company, Philadelphia, PA (US); Dow Global Technologies LLC, Midland, MI (US)

(*) Notice: Subject to any disclaimer, the term of this patent is extended or adjusted under 35 U.S.C. 154(b) by 36 days.

This patent is subject to a terminal disclaimer.

(21) Appl. No.: 15/071,265

(22) Filed: Mar. 16, 2016

(65) Prior Publication Data

US 2016/0272825 A1 Sep. 22, 2016

Related U.S. Application Data

(60) Provisional application No. 62/134,051, filed on Mar. 17, 2015.

(51) Int. Cl.
| | |
|---|---|
| *C08K 5/10* | (2006.01) |
| *C08K 5/20* | (2006.01) |
| *C09D 7/12* | (2006.01) |
| *C09D 7/00* | (2006.01) |
| *C09D 5/00* | (2006.01) |
| *C08K 5/05* | (2006.01) |
| *C08K 5/101* | (2006.01) |
| *C08K 5/103* | (2006.01) |
| *C08K 5/41* | (2006.01) |

(52) U.S. Cl.
CPC .............. *C09D 7/1233* (2013.01); *C09D 5/00* (2013.01); *C09D 7/00* (2013.01); *C08K 5/05* (2013.01); *C08K 5/101* (2013.01); *C08K 5/103* (2013.01); *C08K 5/20* (2013.01); *C08K 5/41* (2013.01)

(58) Field of Classification Search
CPC .................................. C08K 5/101; C08K 5/20
See application file for complete search history.

(56) References Cited

U.S. PATENT DOCUMENTS

| | | |
|---|---|---|
| 2003/0212296 A1 | 11/2003 | Frings et al. |
| 2007/0021571 A1 | 1/2007 | Kamata et al. |
| 2012/0258249 A1 | 10/2012 | Adamson et al. |
| 2013/0052431 A1 | 2/2013 | Enomoto et al. |
| 2015/0361290 A1* | 12/2015 | Arumugam .......... C09D 133/06 524/560 |
| 2016/0152856 A1* | 6/2016 | Arturo .................. C08F 136/14 427/385.5 |
| 2016/0272825 A1* | 9/2016 | Arturo ..................... C09D 7/00 |

FOREIGN PATENT DOCUMENTS

| | | | |
|---|---|---|---|
| EP | 0387654 | A2 | 9/1990 |
| JP | 2001181348 | A | 7/2001 |
| WO | 2009097142 | A1 | 8/2009 |
| WO | 2011097443 | A1 | 8/2011 |
| WO | 2015157929 | A1 | 10/2015 |
| WO | WO 2015/157929 A1 * | 10/2015 | ............. C08K 5/101 |

* cited by examiner

*Primary Examiner* — Rip A Lee
(74) *Attorney, Agent, or Firm* — Reid S. Willis

(57) ABSTRACT

The present invention is a composition comprising a solution or a dispersion of polymer particles, a sorbate ester or sorbamide curing agent, and a cure modulating additive for the curing agent. The curing agent is a sorbic acid ester or a sorbamide and the cure modulating agent is a reagent capable of accelerating or attenuating the rate of cure of the curing agent. The control of cure kinetics is important for speeding up cure rates where rates are too slow or by reducing cure rates where curing too rapidly results in undesirable color formation.

9 Claims, No Drawings

SORBIC ACID ESTER CONTAINING COATINGS COMPOSITION

BACKGROUND OF THE INVENTION

The present invention relates to a coating composition comprising a sorbic acid ester or sorbamide composition, more particularly a coating composition comprising a sorbic acid ester or sorbamide and an additive designed to control the cure rate of a coating composition containing a sorbic acid ester or sorbamide.

It has recently been discovered that sorbic acid esters and sorbamides are effective as high boiling, low VOC coalescents for coating compositions that have been shown to enhance film hardness and film formation at or below room temperature. A tendency of these coalescents is their propensity for curing too rapidly, thereby resulting in the formation of undesirable color bodies, or curing too slowly. It would therefore be an advance in the art of coating compositions to discover a way to control the cure kinetics of sorbic acid esters and sorbamides.

SUMMARY OF THE INVENTION

The present invention addresses a need in the art by providing a composition comprising: a1) a polymer and a solvent for the polymer or a2) an aqueous dispersion of polymer particles; b) from 0.5 to 35 weight percent of a sorbic acid ester or sorbamide curing agent; and c) a cure modulating additive which is a compound functionalized with i) an S=O group; ii) a carbonyl group, iii) an amine group, iv) a hydroxyl group; v) a carboxylic acid group; vi) a sulfonic acid or sulfonate group; vii) a phosphoryl group; viii) a phosphonic acid or phosphonate group; or ix) an amide, urea, or urethane group; with the proviso that when the sorbic acid ester or the sorbamide is not functionalized with a primary or secondary amine group or a hydroxyl group 5 to 7 bonds removed from the oxygen atom of the sorbic acid ester or sorbamide carbonyl group, the cure modulating additive is functionalized with i) an amine group; ii) a hydroxyl group; iii) a carboxylic acid group; iv) a sulfonic acid group; v) an S=O group; or vi) a phosphorus acid group. The composition of the present invention is useful for making coatings that can be cured efficiently without the formation of undesirable color bodies.

DETAILED DESCRIPTION OF THE INVENTION

The present invention provides a composition comprising: a1) a polymer and a solvent for the polymer or a2) an aqueous dispersion of polymer particles; b) from 0.5 to 35 weight percent of a sorbic acid ester or sorbamide curing agent; and c) a cure modulating additive which is a compound functionalized with i) an S=O group; ii) a carbonyl group, iii) an amine group, iv) a hydroxyl group; v) a carboxylic acid group; vi) a sulfonic acid or sulfonate group; vii) a phosphoryl group; viii) a phosphonic acid or phosphonate group; or ix) an amide, urea, or urethane group; with the proviso that when the sorbic acid ester or the sorbamide is not functionalized with a primary or secondary amine group or a hydroxyl group 5 to 7 bonds removed from the oxygen atom of the sorbic acid ester or sorbamide carbonyl group, the cure modulating additive is functionalized with i) an amine group; ii) a hydroxyl group; iii) a carboxylic acid group; iv) a sulfonic acid group; v) an S=O group; or vi) a phosphorus acid group.

The sorbic acid or sorbamide curing agent is preferably a liquid at 20° C. and preferably characterized by the following formula:

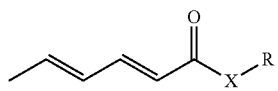

where R is a $C_1$-$C_{20}$ linear or branched alkyl group optionally functionalized with an ether, thioether, amine, hydroxyl, ester, phenyl, alkyenyl groups, or combinations thereof; and C(O)X is an ester group or an amide group.

Preferably, R is —$(CH_2$—$CH(R^1)$—$O)_n$—$R^2$, —$CH(R^1)$—$CH_2$—$O$—$R^2$, or linear or branched —$R^3$—$OR^2$;

where $R^1$ is H, $C_1$-$C_6$-alkyl, —$CH_2OH$, or phenyl;

$R^2$ is H, $C_2$-$C_6$-alkyl, benzyl, or $CH_3CH$=$CH$—$CH$=$CH$=$C(O)$—; allyl; —$C(O)$—$CR^4$=$CH_2$;

$R^3$ is a bivalent $C_4$-$C_{10}$-linear or branched alkyl or hydroxyalkyl group;

$R^4$ is H or $CH_3$; and n is 1 to 7.

The curing agent is preferably a liquid at 25° C. and preferably has a molecular weight in the range of 126 g/mol to 2000 g/mol, more preferably to 1000 g/mol, and most preferably to 500 g/mol. It is possible that the curing agent includes more than one sorbic acid ester or sorbamide groups, or combinations thereof.

The curing agent of the composition of the present invention can be prepared in a variety of ways such as those set forth in the following schemes where R is as previously defined and Y is OH or Cl:

Scheme 1

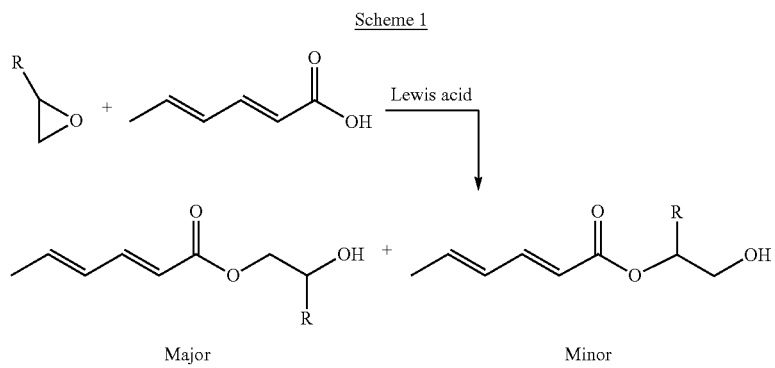

Scheme 2
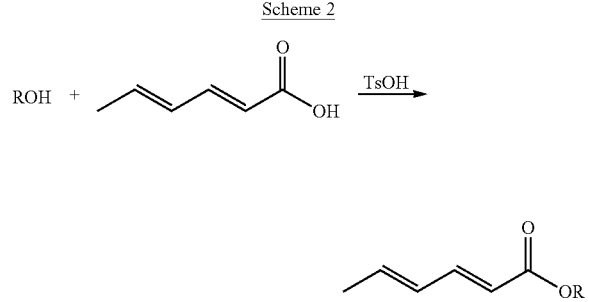
Scheme 3
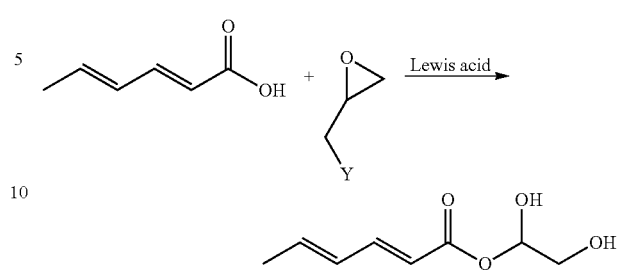
Scheme 4
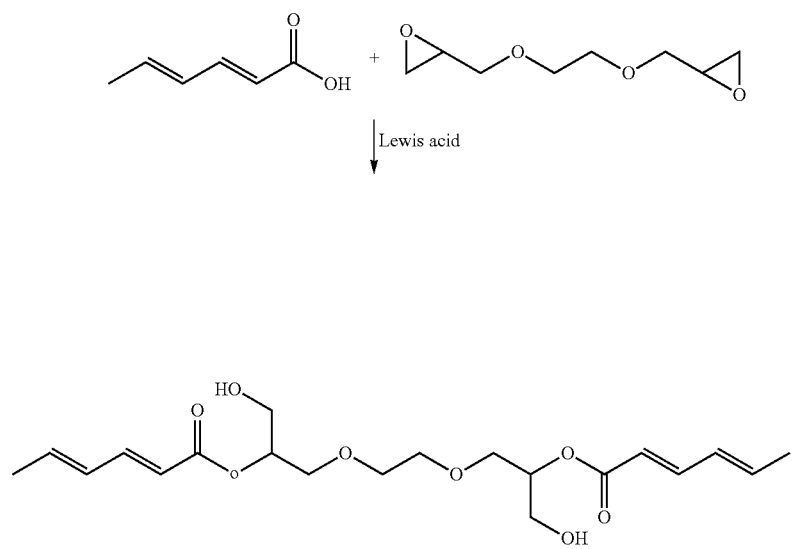
Scheme 5
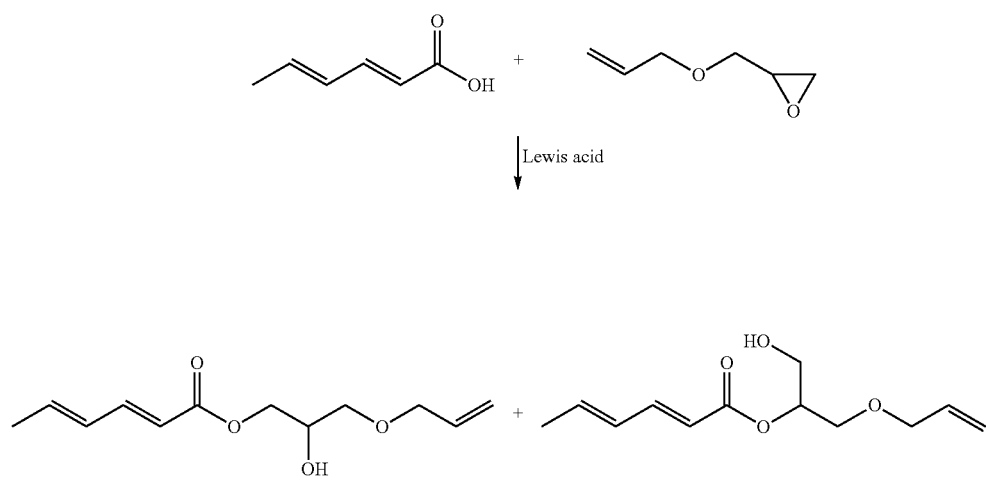

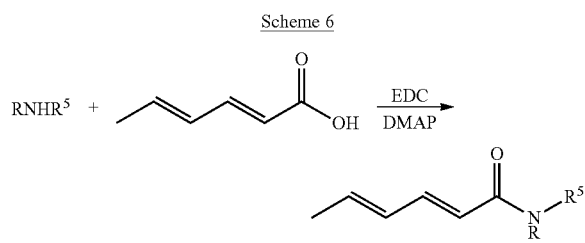

Scheme 6

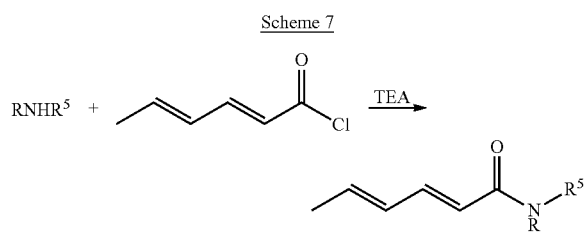

Scheme 7

EDC is 1-ethyl-3-(3-dimethylaminopropyl)carbodiimide, DMAP is 4-dimethylamino pyridine, and TEA is triethylamine.

The curing agent is preferably a sorbate ester, which can also be prepared, for example, by way of transesterification of an alcohol and the sorbic acid or by reaction of the alcohol with an acid halide or an anhydride of the sorbic acid.

The cure modulating additive can be one that accelerates the rate of cure, one that attenuates the rate of cure, or one that can serve both functions. It has been discovered that sorbic acid esters or sorbamides cure too slowly when functionalized with a primary or secondary amine, or a primary, secondary or tertiary alcohol that is from 5 to 7, preferably 5 to 6 bonds removed from the oxygen atom of the sorbic acid ester or sorbamide carbonyl group. Examples of sorbic acid esters with an alcohol or amine that is from 5 or 6 bonds removed from the oxygen atom of the sorbic acid ester or sorbamide are illustrated:

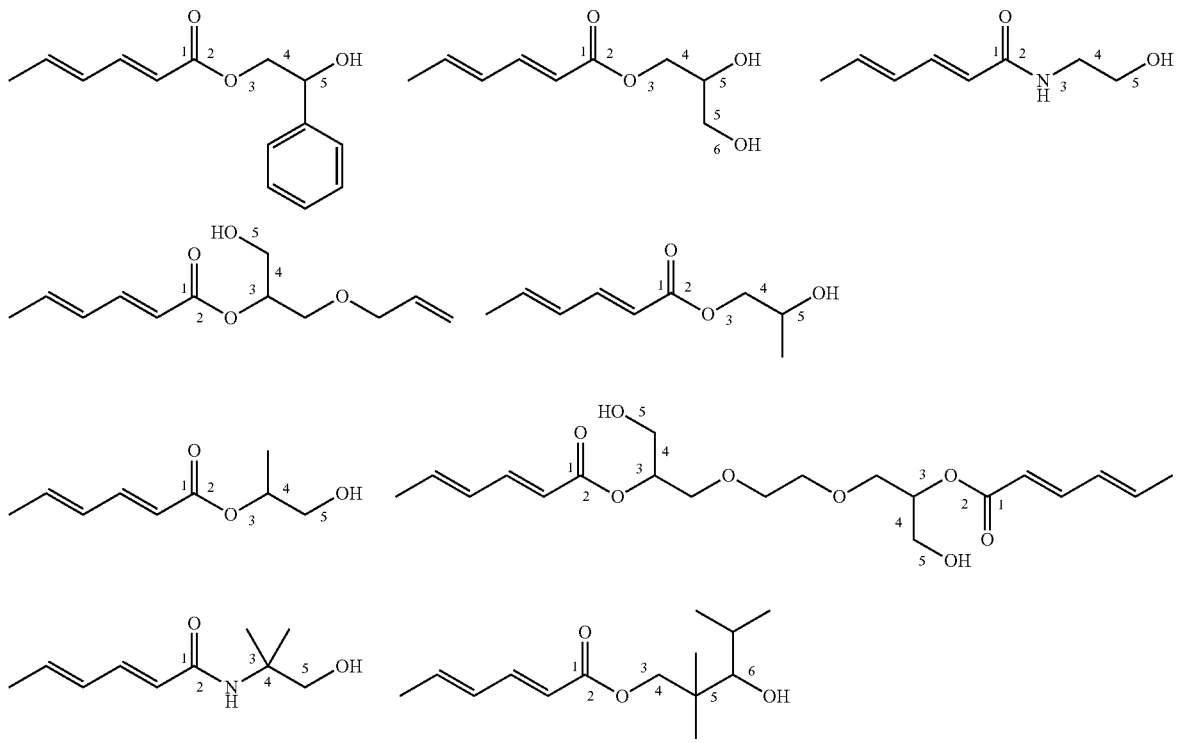

Examples of sorbic acid esters that are not functionalized with amine or alcohol group 5-7 carbon atoms removed from the oxygen atom of the sorbic acid ester or sorbamide carbonyl group are illustrated below.

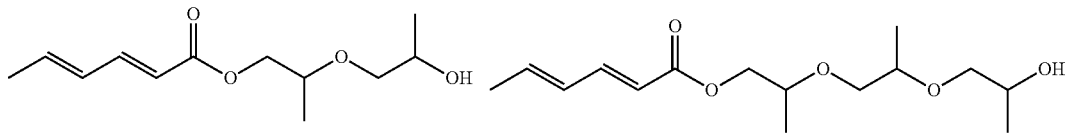

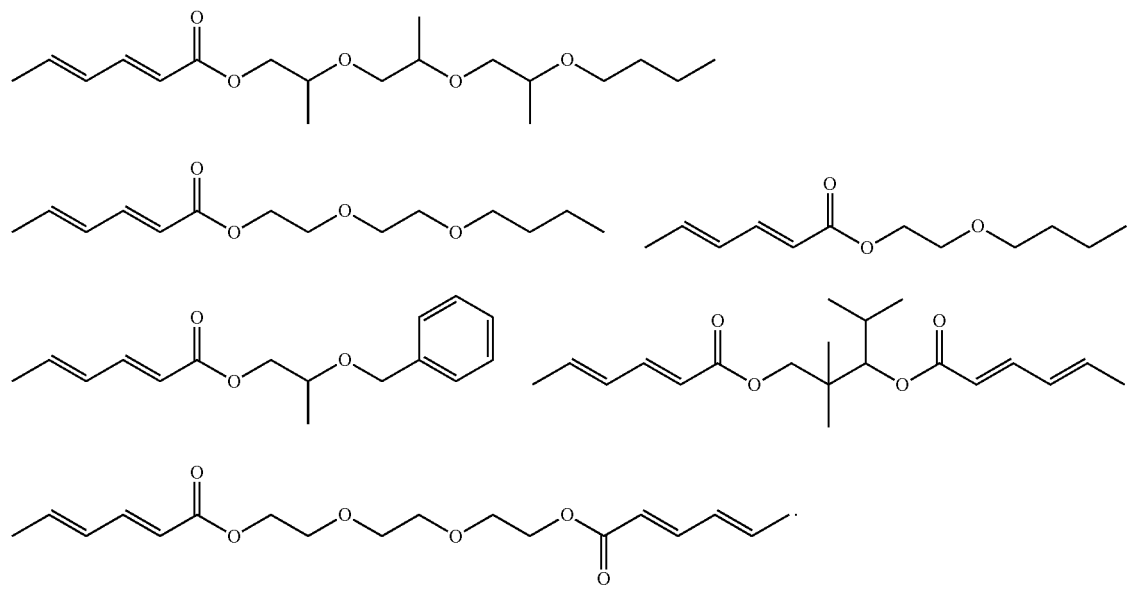

Additives that are capable of accelerating the rate of cure of sorbic acid esters and sorbamides having the alcohol or amine functionality as described above are compounds functionalized with a) an S=O group including dimethyl sulfoxide, diphenyl sulfoxide, di-4-tolyl sulfoxide, methyl phenyl sulfoxide, dibenzyl sulfoxide, dibutyl sulfoxide, or di-t-butyl sulfoxide; b) a carbonyl group such as methyl dodecanoate, methyl decanonate, methyl ethyl ketone, or nonaldehyde; c) an amine group such as 1-decylamine, 1-dodecylamine, diisopropylamine, tributylamine, or diisopropylethylamine; d) a hydroxyl group such as 2-ethyl-1-hexanol, 1-decanol, 3-hydroxy-2,2,4-trimethylpentyl 2-methylpropanoate (commercially available as Texanol coalescent), 2-nonanol, ethylene glycols, diethylene glycol, triethylene glycol, propylene glycol, dipropylene glycol methyl ether, phenol, or benzyl alcohol; e) a carboxylic acid group such as phenyl acetic acid, benzoic acid, 1-decanoic acid, or 1-octanoic acid; f) a sulfonic acid or sulfonate group such as methyl sulfonic acid, benzene sulfonic acid, 4-tolyl sulfonic acid, 1-octylsulfonic acid, 1-dodecyl sulfonic acid, methyl methanesulfonate, or methyl tosylate; g) a phosphoryl group such as triphenylphosphine oxide, tributylphosphine oxide, triethylphosphine oxide, or tribenzylphosphine oxide; h) a phosphonic acid or phosphonate group such as ethylphosphonic acid, monoethyl ethylphosphonate, butylphosphonic acid, benzylphosphonic acid, or benzenephosphonic acid; or i) an amide, urea, or urethane group such as N-ethylpropionamide, N-butyl valeramide, N,N'-diethylurea, N,N'-dibutylurea, diethylurethane, and diethylurethane.

Additives that are capable of slowing down the rate of cure of sorbic acid esters and sorbamides that do not have the aforementioned alcohol or amine functionality are compounds functionalized with an S=O group; an amine group; a hydroxyl group; a carboxylic acid group; a sulfonic acid group; or a phosphorus acid group.

Though not bound by theory, it is believed that the curing agent cures too rapidly or too slowly without the cure modulating additive because of the presence or absence of intramolecular hydrogen bonding in the curing agent. More particularly, it is believed that a hydroxyl or amine group 5-7 bonds removed from the oxygen atom of the sorbic acid ester or sorbamide group interferes with the curing mechanism; it is further believed that the addition of a so-called hydrogen-bonding acceptor (for example, a sulfoxide) disrupts intramolecular hydrogen bonding, thereby promoting curing. Sorbic acid esters or sorbamides that do not contain amines or hydroxyl groups capable of intramolecular hydrogen bonding cure too rapidly and the cure rate for these compounds can be attenuated by interaction with the carbonyl group of the sorbic acid ester or sorbamide. Some classes of cure modulating additives can serve as either cure rate accelerators or cure rate attenuators (for example, alcohols, a sulfoxides, or a primary or secondary amines).

The sorbic acid ester or sorbamide is advantageously combined with the cure modulating agent in proportions that suitably control the rate of cure of the sorbic acid ester or sorbamide. Where the cure modulating contains amine or hydroxyl functionality as described hereinabove, the mole equivalents of preferably the sulfoxide, amine, or hydroxyl group of the cure modulating agent is from 0.25, more preferably from 0.5, most preferably from 0.75; to 4, more preferably to 2, most preferably to 1.25 with respect to the hydroxyl or amine groups in the curing agents. Similarly, where the cure modulating agent does not contain amine or hydroxyl functionality, the mole equivalents of preferably the sulfoxide or hydroxyl groups is from 0.25, more preferably from 0.5, most preferably from 0.75; to 4, more preferably to 2, most preferably to 1.25 with respect to the carbonyl groups in the curing agent. By way of illustration, the following compound has two equivalents of OH groups per molecule and would therefore require twice as many moles of a compound containing a single hydrogen acceptor group, such as dimethyl sulfoxide, to achieve the same mole equivalents:

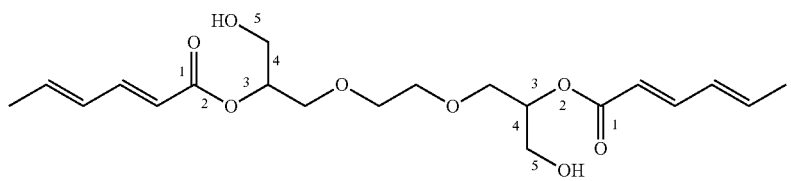 [SMILES: C/C=C/C=C/C(=O)OC(CO)COCCOCC(CO)OC(=O)/C=C/C=C/C]

The composition comprises a1) a polymer and a solvent for the polymer, which is a suitable organic solvent such as toluene, xylene, or mesitylene, or a2) an aqueous dispersion of polymer particles. Preferably, the composition comprises an aqueous dispersion of polymer particles (a latex). The curing agent, preferably the sorbate ester, is preferably imbibed into the polymer particles. As used herein, the word "imbibed" means that at least 60% of the coalescent in the composition is incorporated into the polymer particles, that is, less than 40% of the coalescent is present in the aqueous phase of the latex. Preferably, at least 90%, more preferably at least 95, and most preferably at least 98% of the coalescent is imbibed into the polymer particles. The extent of imbibing can be determined by proton NMR spectroscopy, as follows: In a first experiment, a latex containing the curing agent is placed as is in an NMR spectroscopy tube and resonances associated with the coalescent are monitored in the aqueous phase of the emulsion latex. Under this condition, signals from the aqueous phase are the only ones detected because the molecules in the latex particles are partly immobilized, leading to extremely broad signals that are not detected within the spectral width for aqueous phase materials. The spectra reveals only slight traces of the curing agent (<1% by weight) in the aqueous phase. In contrast, sorbic acid can be detected quantitatively or nearly quantitatively in the aqueous phase, which demonstrates that it does not partition into the latex particles.

In a second independent NMR spectroscopic test to demonstrate imbibing of the coalescent, a broadline proton resonance is monitored for molecules in the latex particles by varying the concentration of the coalescent in the latex from 0 to 16% weight, based on the weight of the latex. As the amount of the coalescent is increased, the linewidth narrows linearly, which corresponds to a reduction of the $T_g$ of the polymer or an increase in the polymer dynamics of the polymers in the particles due to the increase in the curing agent concentration. The narrowing of linewidth of the resonances associated with the polymer in the particles also directly correlates with minimum film formation of the films arising from these emulsions.

The curing agent, preferably the sorbate ester, is preferably used at a concentration in the range of from 1 to 20, more preferably to 12 weight percent, based on the weight of the polymer particles and the sorbic acid ester or sorbamide. Examples of suitable aqueous dispersions of polymer particles (also known as latexes) include acrylic, styrene-acrylic, vinyl ester-acrylic, polyurethane, alkyd, and vinyl-ester polyethylene latexes. The solids content of the latex is preferably in the range of 30 to 60%, and the $T_g$ of the polymer particles, as calculated using the Fox equation, is preferably in the range of from 0° C., more preferably from 20° C., to 100° C., more preferably to 60° C.

The composition may be pigmented or non-pigmented. A preferred pigmented coating contains $TiO_2$. The polymer particles may also include structural units of other monomers, particularly a post-crosslinking monomer (that is, a monomer that causes significant crosslinking after onset of film formation of the composition when applied to a substrate). Examples of suitable post-crosslinking monomers include acetoacetoxyethyl methacrylate (AAEM) and diacetone acrylamide (DAM).

Additionally, the composition advantageously further includes one or more of the following materials: rheology modifiers; opaque polymers; fillers; colorants; pigments, including encapsulated or partially encapsulated pigments; dispersants; wetting aids; dispersing aids; anti-oxidants; dispersant adjuvants; chelating agents; surfactants; co-solvents; additional coalescing agents and plasticizers; defoamers; preservatives; anti-mar additives; flow agents; leveling agents; slip additives; and neutralizing agents.

Coatings with suitable hardness can be prepared from the composition of the presentation efficiently and with a reduction of yellowing as compared to sorbic acid ester compositions that do not contain suitable cure modulating agents.

EXAMPLES

Examples 1-4—General Procedure for Curing an Applied Coating of a Sorbic acid Ester and a Cure Modulating Agent The sorbic acid ester (1 g) was placed in a vial followed by addition of the cure modulating agent (1 g). The components were mixed using a vortex mixer to achieve a homogenous solution. A thin film of sorbic acid ester (20 mil, 0.5 mL) was drawn down on a portable Diamond plug and allowed to dry at ambient condition. The amount of sorbic acid ester conversion to polymers, the measure of cure chemistry, was followed by FTIR spectroscopy at various time intervals by monitoring change in the functionality in the sorbate molecule. The yellowing of sorbate/cure modulator mixture (Table 2) was monitored by measuring the absorbance at 420 nm by Cary-50 UV-Vis Spectrophotometer.

Comparative Examples 1-2—General Procedure for Curing an Applied Coating of a Sorbic Acid Ester and a Cure Modulating Agent Curing with No Cure Modulating Agent A thin film of sorbic acid ester (20 mil, 0.5 mL) was drawn down on a portable Diamond plug and allowed to dry at ambient condition and curing was measured as described in Example 1.

Table 1 illustrates the effect of a cure modulating agent on the cure rate of hydroxypropyl sorbate. Texanol coalescent is 3-hydroxy-2,2,4-trimethylpentyl 2-methylpropanoate.

TABLE 1

The Effect of a Cure Modulating Agent of the Cure Rate of Hydroxypropyl Sorbate

| Example | Modulator | modulator:HPS (w/w) | 100% cure time |
|---|---|---|---|
| Comp. 1 | None | | No curing after 30 d |
| 1 | 2-Ethyl-1-hexanol | 50:50 | 4.5 d |
| 2 | Texanol coalescent | 50:50 | 10 d |
| 3 | Dimethyl Sulfoxide | 50:50 | 3.5 d |

The data illustrate that the inclusion of the rate accelerating cure modulating agent dramatically increase the rate of cure, with dimethyl sulfoxide being particularly effective.

Table 2 illustrates the effect of a cure modulating agent on the deceleration of the cure rate of ethyl sorbate (ES). The % conversion refers to the conversion of the ethyl sorbate at 10 h and % yellowing is normalized to Comparative Example 2 at 100.

TABLE 2

The Effect of a Cure Modulating Agent of the Cure Rate of Ethyl Sorbate

| Example | Modulator | modulator:ES (w/w) | % Conversion @ 10 h | % Yellowing after 4 wks |
|---|---|---|---|---|
| Comp. 2 | None | | 99 | 100 |
| 4 | 2-nonanol | 50:50 | 40 | 23 |
| 5 | Texanol coalescent | 50:50 | 56 | 19 |

The data show that the cure modulating agent slows down the rate of conversion and concomitantly reduces yellowing of the cured ethyl sorbate. Fully formulated paints were prepared using hydroxypropyl sorbate or ethyl sorbate and a suitable modulator.

Table 3 shows the Master Paint Formulation used to make Examples 6-11 and Comparative Examples 3-8.

TABLE 3

Master Gloss Paint Formulation

| Stage | Materials | Wt (g) |
|---|---|---|
| Grind | TiPure R-746 TiO$_2$ | 452.8 |
| | Water | 30 |
| | BYK-024 Defoamer | 3 |
| | TRITON ™ X-100 Surfactant | 6.6 |
| | TAMOL ™ 2002 Dispersant | 3 |
| | ACRYSOL ™ RM-2020 NPR Thickener | 30 |
| | Grind Sub-total | 644.41 |
| Let-down | RHOPLEX ™ HG-95P Emulsion Polymer | 882.7 |
| | BYK-024 Defoamer | 1.5 |
| | Ammonia (28%) | 0.38 |
| | ACRYSOL ™ RM-2020 NPR Thickener | 35.8 |
| | ACRYSOL ™ RM-8W Thickener | 2.67 |
| | Water | 137.06 |
| | Total | 4162.2 |

TRITON, TAMOL, RHOPLEX, and ACRYSOL are all Trademarks of The Dow Chemical Company or its Affiliates.

In the following examples, coalescent (0.311 g) was added to and mixed thoroughly with a portion of the Master Gloss Paint Formulation (20 g) either followed by addition and mixing of no modulator (Comparative Examples 3, 8, and 9), a modulator suitable for cure acceleration (0.311 g, Comparative Examples 4-7; Examples 6-9), or a modulator suitable for cure attenuation (0.311 g, Examples 11-15) to achieve a homogeneous formulation. A thin film of the formulation (~0.25 mm) was drawn down on testing substrates and allowed to dry at ambient condition. The amount of sorbate conversion to polymers, the measure of cure chemistry, was followed by testing performance properties at various time intervals. König Hardness and b*Value color measurements were used to evaluate performance properties In the following Tables 4 and 5, HPS is hydroxypropyl sorbate; ES is ethyl sorbate; EH is 2-ethyl-1-hexanol; DMSO is dimethyl sulfoxide; DBC is DOWANOL™ Butyl Carbitol; and DPM is DOWANOL™ DPM Solvent (a Trademark of The Dow Chemical Company or its Affiliates). DBC is diethylene glycol butyl ether, as illustrated:

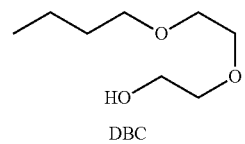

DBC

DPM is dipropylene glycol methyl ether, a mixture of isomers, including $CH_3OCH_2CH(CH_3)OCH_2CH(CH_3)OH$.

König hardness measurements were carried out using a TQC Pendulum Hardness Tester, Model SP0500. The coatings used König measurements were made on Al substrates with a 10-mil (~25-mm) blade gap.

Coatings for color measurements used white Lenta charts as the substrate. Color measurements were made using a BYK-Gardner spectro-guide 45/0 spectrophotometer. The color parameter that is of most interest for this work is the b* value from the CIE L*a*b* color spectra. The b* value represents the balance between blue and yellow, with larger positive numbers indicating more yellowing. A rule of thumb suggests that a color difference with a Δb*>0.5 is visible to the naked eye.

Table 4 illustrates the effect of a cure accelerating modulating agent on the cure rate of hydroxypropyl sorbate, as measured by an 8-day König hardness test.

TABLE 4

Effect of Rate Accelerating Cure-Modulating Agent on Cure Rate of Hydroxypropyl Sorbate in Paint Formulation

| Example | Coalescent | Modulator | Modulator:Coalescent (w/w) | 8-d König Hardness (s) |
|---|---|---|---|---|
| Comp. 3 | Texanol coalescent | None | 0:100 | 23.8 |
| Comp. 4 | Texanol coalescent | EH | 50:50 | 14.8 |
| Comp. 5 | Texanol coalescent | DMSO | 50:50 | 23.3 |
| Comp. 6 | Texanol coalescent | DPM | 50:50 | 19.5 |
| Comp. 7 | Texanol coalescent | DBC | 50:50 | 20.9 |
| Comp. 8 | HPS | None | 0:100 | 32.7 |
| 6 | HPS | EH | 50:50 | 46.3 |
| 7 | HPS | DMSO | 50:50 | 52.4 |
| 8 | HPS | DPM | 50:50 | 43.0 |
| 9 | HPS | DBC | 50:50 | 40.7 |

Table 5 illustrates the effect of a cure attenuating agent on the cure rate of ethyl sorbate, as measured by b* Value.

TABLE 5

Effect of Rate Attenuating Cure-Modulating Agent on Yellowing of Paint Formulation

| Example | Coalescent | Modulator | Modulator:Coalescent (w/w) | b* Value |
|---|---|---|---|---|
| Comp. 9 | ES | None | 0:100 | 0.59 |
| 10 | ES | EH | 50:50 | −1.34 |
| 11 | ES | DMSO | 50:50 | −1.36 |
| 12 | ES | DPM | 50:50 | −1.41 |
| 13 | ES | DBC | 50:50 | −1.47 |
| 14 | ES | 2-Nonanol | 50:50 | −1.09 |
| 15 | ES | Texanol coalescent | 50:50 | −0.97 |

The results of the 8-day König Hardness tests show that paints using the hydroxylpropyl sorbate coalescent cure much more efficiently in the presence of a rate accelerating modulator such as 2-ethyl-1-hexanol; dimethyl sulfoxide; or n-butyl carbitol as compared to Texanol using the same modulators (or absence of any modulator) or hydroxypropyl sorbate with no modulator or with a modulator incapable of hydrogen-bonding with the hydroxyl group of the sorbate coalescent (DBCA).

Moreover, the presence of rate attenuating modulators in ethyl sorbate containing paint formulations provide a marked reduction in b*Value over paint formulations that do not contain such modulators. Note that for Example 15, Texanol coalescent shows efficacy as a modulator, not as a coalescent. DBCA is ineffective as a rate attenuating modulator presumably because of its inability to hydrogen bond with the carbonyl oxygen of the ethyl sorbate.

The invention claimed is:

1. A composition comprising: a1) a polymer and a solvent for the polymer or a2) an aqueous dispersion of polymer particles; b) from 0.5 to 35 weight percent of a sorbic acid ester or sorbamide curing agent; and c) a cure modulating additive which is a compound functionalized with i) an S=O group; ii) a carbonyl group, iii) an amine group, iv) a hydroxyl group; v) a carboxylic acid group; vi) a sulfonic acid or sulfonate group; vii) a phosphoryl group; viii) a phosphonic acid or phosphonate group; or ix) an amide, urea, or urethane group; with the proviso that when the sorbic acid ester or the sorbamide is functionalized with a primary or secondary amine group or a hydroxyl group 5 to 7 bonds removed from the oxygen atom of the sorbic acid ester or sorbamide carbonyl group, the cure modulating additive is functionalized with i) an amine group; ii) a hydroxyl group; iii) a carboxylic acid group; iv) a sulfonic acid group; or v) a phosphorus acid group.

2. The composition of claim 1 wherein the curing agent is a sorbic acid ester or sorbamide functionalized with a primary or secondary amine group or a hydroxyl group 5 to 7 bonds removed from the oxygen atom of the sorbic acid ester or sorbamide carbonyl.

3. The composition of claim 2 wherein the cure modulating additive is a compound functionalized with an S=O group, a hydroxyl group, or an amine group; and wherein the mole equivalents of S=O, hydroxyl, or amine groups of the cure modulating additive to the curing agent is from 0.25 to 4.

4. The composition of claim 3 wherein the curing agent is selected from the group consisting of:

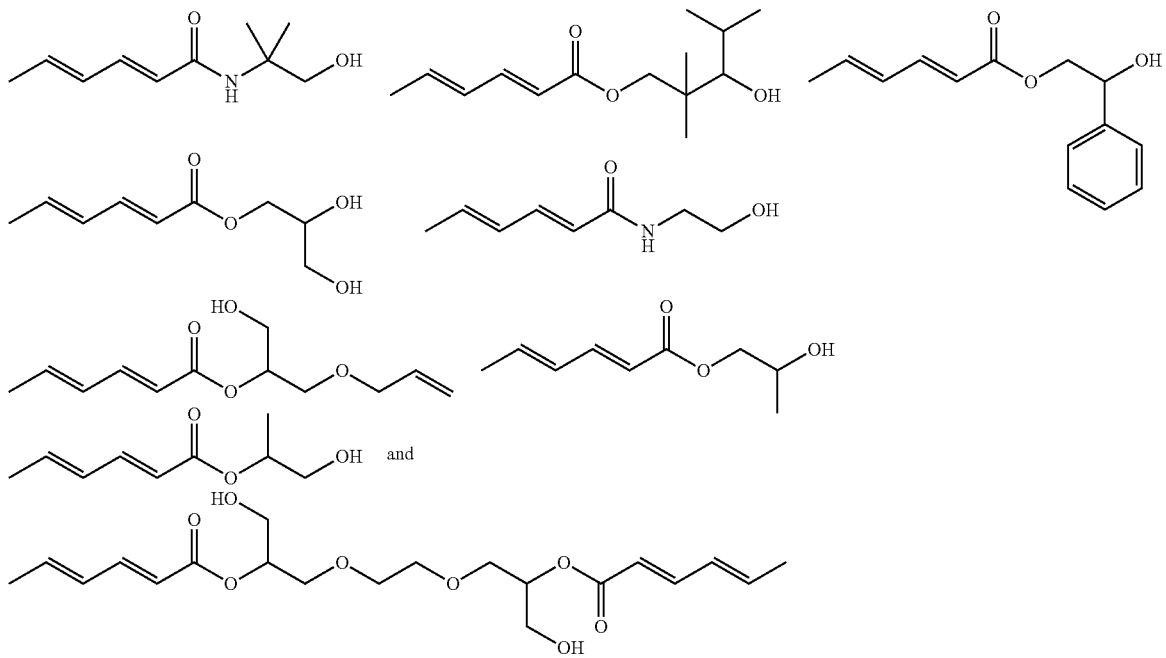

wherein the cure modulating additive is dimethyl sulfoxide; 2-ethyl-1-hexanol; diethylene glycol butyl ether; or dipropylene glycol methyl ether; or 2-nonanol; and wherein the mole equivalents of the cure modulating additive to the curing agent is from 0.5 to 2.

5. The composition of claim 1 wherein the curing agent is a sorbic acid ester or sorbamide not functionalized with a primary or secondary amine group or a hydroxyl group that is from 5 to 7 bonds removed from the oxygen atom of the sorbic acid ester or sorbamide carbonyl group, wherein the cure modulating additive is a primary or secondary alcohol or a sulfoxide; wherein the mole equivalents of sulfoxide or hydroxyl groups of the cure modulating additive to the curing agent is from 0.25 to 4.

6. The composition of claim 5 wherein the curing agent is selected from the group consisting of:

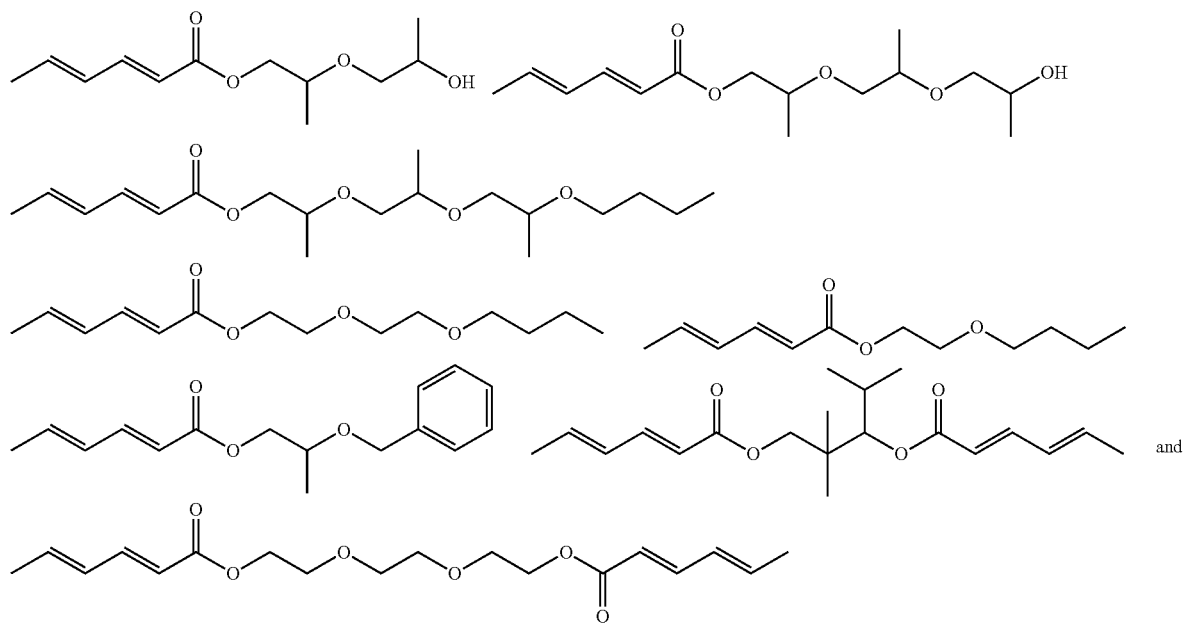

wherein the cure modulating additive is dimethyl sulfoxide; 2-ethyl-1-hexanol; diethylene glycol butyl ether; dipropylene glycol methyl ether; 3-hydroxy-2,2,4-trimethylpentyl 2-methylpropanoate; or 2-nonanol; and wherein the mole equivalents of the cure modulating additive to the curing agent is from 0.5 to 2.

7. The composition of claim 1 wherein the curing agent is a sorbic acid ester, and wherein the composition further comprises at least one component selected from the group consisting of a pigment, a defoamer, a surfactant, a dispersant, a rheology modifier, and a neutralizing agent.

8. The composition of claim 1 wherein the curing agent is a sorbic acid ester, and wherein the composition further comprises a pigment, a defoamer, a surfactant, a dispersant, a rheology modifier, and a neutralizing agent.

9. A composition comprising: a) an aqueous dispersion of polymer particles; b) from 1 to 20 weight percent of a sorbic acid ester or sorbamide curing agent; and c) a cure modulating additive which is a compound functionalized with i) an S=O group; ii) a carbonyl group, iii) an amine group, iv) a hydroxyl group; v) a carboxylic acid group; vi) a sulfonic acid or sulfonate group; vii) a phosphoryl group; viii) a phosphonic acid or phosphonate group; or ix) an amide, urea, or urethane group; with the proviso that when the sorbic acid ester or the sorbamide is functionalized with a primary or secondary amine group or a hydroxyl group 5 to 7 bonds removed from the oxygen atom of the sorbic acid ester or sorbamide carbonyl group, the cure modulating additive is functionalized with i) an amine group; ii) a hydroxyl group; iii) a carboxylic acid group; iv) a sulfonic acid group; or v) a phosphorus acid group; wherein aqueous dispersion of polymer particles has a solids content in the range of from 30 to 60 weight percent; and wherein the curing agent is a liquid at 25° C. and is imbibed into the polymer particles.

\* \* \* \* \*